United States Patent
Stjernholm et al.

(10) Patent No.: US 7,933,214 B2
(45) Date of Patent: Apr. 26, 2011

(54) FAULT DETECTION IN A TRANSPORT NETWORK

(75) Inventors: Paul Stjernholm, Lidingö (SE); Tomas Nylander, Värmdö (SE); Oscar Zee, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 182 days.

(21) Appl. No.: 12/201,139

(22) Filed: Aug. 29, 2008

(65) Prior Publication Data

US 2010/0054140 A1  Mar. 4, 2010

(51) Int. Cl.
 *H04L 12/26* (2006.01)
(52) U.S. Cl. ......................... 370/248; 370/252
(58) Field of Classification Search ............... None
See application file for complete search history.

(56) References Cited

U.S. PATENT DOCUMENTS

| | | | | |
|---|---|---|---|---|
| 5,771,274 A * | 6/1998 | Harris | | 379/22.03 |
| 6,665,718 B1 * | 12/2003 | Chuah et al. | | 709/225 |
| 6,763,380 B1 | 7/2004 | Mayton et al. | | |
| 6,795,400 B1 | 9/2004 | Schick | | |
| 7,159,026 B2 * | 1/2007 | Lau et al. | | 709/226 |
| 7,519,006 B1 * | 4/2009 | Wing | | 370/252 |
| 2003/0101338 A1 | 5/2003 | Mullen et al. | | |
| 2008/0031145 A1 * | 2/2008 | Ethier et al. | | 370/248 |
| 2008/0071925 A1 | 3/2008 | Leighton et al. | | |
| 2008/0089241 A1 | 4/2008 | Lloyd et al. | | |

OTHER PUBLICATIONS

Postel, J.: RFC792—Internet Control Message Protocol. Sep. 1981; retrieved online http://www.faqs.org/rfcs/rfc792.html, 7 pages.
PCT International Search Report and Written Opinion of the International Searching Authority, corresponding to PCT/SE2009/050870, mailed Dec. 14, 2009, 11 pages.

* cited by examiner

*Primary Examiner* — Kwang B Yao
*Assistant Examiner* — Alex Skripnikov
(74) *Attorney, Agent, or Firm* — Myers Bigel Sibley & Sajovec, P.A.

(57) ABSTRACT

A device associated with a transport network generates a first traceroute through the transport network, and monitors a performance measure associated with the transport network. The device also compares the performance measure to a criterion, and determines degradation in the transport network when the performance measure matches the criterion. The device further generates a second traceroute through the transport network when the degradation occurs in the transport network, where the first and second traceroutes are used to determine a source of the degradation in the transport network.

16 Claims, 15 Drawing Sheets

FIG. 11

| BASE STATION ID 1110 | NOTIFICATION 1120 | TRACEROUTE INFORMATION 1130 | END POINT INFORMATION 1140 | TIME STAMP 1150 |
|---|---|---|---|---|
| BS 600-1 | PRE-DEGRADATION | GOOD | 400-4, 400-2, 400-1 | TIME1 |
| BS 600-2 | PRE-DEGRADATION | GOOD | 400-5, 400-2, 400-1 | TIME2 |
| BS 600-3 | PRE-DEGRADATION | GOOD | 400-6, 400-2, 400-1 | TIME3 |
| BS 600-1 | POST-DEGRADATION | DEGRADATION | 400-4, 400-2, 400-1 | TIME4 |
| BS 600-2 | POST-DEGRADATION | DEGRADATION | 400-5, 400-2, 400-1 | TIME5 |
| BS 600-3 | POST-DEGRADATION | DEGRADATION | 400-6, 400-2, 400-1 | TIME6 |

1100

1160

1170

FAULT DETECTION IN A TRANSPORT NETWORK

TECHNICAL FIELD

Embodiments described herein relate generally to communication systems, and, more particularly, to fault detection in a telecommunication system.

BACKGROUND

A mobile telecommunication system may include control nodes and access nodes interconnected by a transport network. The control nodes may include one or more entities (e.g., mobile switching centers, media gateways, mobility management entities, serving gateway support nodes, radio network controllers, base station controllers, etc.) that transfer/receive voice and/or data to a circuit-switched and/or packet-switched network. The access nodes may include one or more entities (e.g., base stations, etc.) for transmitting voice and/or data to user equipment and the control nodes. The entities of the access nodes may connect to the entities of the control nodes to establish communication services.

The transport network may include a network of entities that connect the control nodes to the access nodes. For example, when the transport network is a packet-switched network (e.g., via an Internet protocol (IP)-based transport or a Multiprotocol Label Switching (MPLS)-based transport), the transport network may include one or more network devices (e.g., routers) interconnected by links (e.g., wired, wireless, and/or optical connections). The routers may be interconnected using a variety of topologies (e.g., a hierarchical topology, a ring topology, a mesh topology, etc.).

For example, when a base station in the access nodes connects with the control nodes, each connection is established via the base station being provided a route through the transport network, via one or more routers. The provided route depends on the transport network topology. When there are faults, failures, or degradations in the transport network, such faults, failures, or degradations may be detected by a base station as IP packet losses, increased latency or delay, and/or increased jitter or delay variation.

A failure or degradation may arise in the transport network due to router failure, link failure, and temporary overload due to poor dimensioning of the transport network. Although a problem may be detected by the base station, the base station is unable to identify a source of the problem (e.g., a failing link(s), a failing router(s), etc.). This may be especially true when the transport network is leased from a transport network provider that is external to an owner (e.g., a mobile operator) of the access nodes and/or the control nodes. In such cases, physical access to the transport network's routers may be impossible. A contract between the transport network provider and the mobile operator may be governed by a service level agreement (SLA) stipulating performance levels to be maintained (e.g., defined by packet loss rate, latency, and/or jitter).

SUMMARY

It is an object of the invention to overcome at least some of the above disadvantages and to determine a source of a fault (or degradation) in a transport network based on information associated with the transport network and detected by one or more base stations associated with access nodes.

Embodiments described herein may provide systems and/or methods that determine a source of degradation in a transport network. For example, in one embodiment, the systems and/or methods may include utilizing a traceroute (e.g., a tool used to determine a route taken by packets across an IP network) to determine the source of the degradation in the transport network. A base station may maintain a list of routes to associated devices (or nodes) provided in control nodes, where a route may include address information of devices (e.g., devices provided in the transport network) adhering to the route. The list may be updated when a control node device, unknown to the base station, is detected by the base station (e.g., via a bearer setup request generated by the control nodes). Traceroutes may be obtained periodically in undisturbed conditions (i.e., when the base station does not detect transport network degradation from acceptable conditions) by the base station to maintain an updated reference route. This may ensure that dynamic routing protocols (e.g., an open shortest path first (OSPF) protocol) do not make it impossible to determine or detect a source of the degradation (or failure).

A "traceroute," as the term is used herein, is to be broadly construed to include a mechanism that records a route (e.g., specific routers at each hop) through a network, and calculates an amount of time each hop took. A traceroute may provide an understanding of where problems are in a network. In one embodiment, the traceroute may send a packet that includes a time limit value (e.g., a time to live (TTL)) that is designed to be exceeded by a first router that receives it. The first router may return a time exceeded message that enables the traceroute to determine the time required for the hop to the first router. Increasing the time limit value, the traceroute may resend the packet so that it will reach a second router in the path to the destination. The second router may return another time exceeded message, and the traceroute may continue this procedure. The traceroute may determine when the packet reaches the destination by including a port number that is outside a normal range. When the packet is received by the destination, a port unreachable message may be returned by the destination, which may enable the traceroute to measure the time length of the final hop.

When the base station detects transport network degradation, the base station may execute a second traceroute towards a concerned control node, and may send a notification (e.g., via an operation and maintenance (O&M) link) and associated traceroutes to a management entity (e.g., an operations support system (OSS)). The management entity may aggregate notification information from several base stations, and, via correlation of traceroutes, may determine a source of the degradation and/or narrow down identification of the source. For example, if a degradation (or failure) is detected by two (or more) base stations partially routed along a common transport network path, the traceroutes may permit the management entity to narrow the failure down to at least the routers in the common path. If data traffic and O&M traffic are carried on the same physical media (e.g., a link) and the media fails, the notifications may not reach the management entity. However, the base station may locally store the notification, and may provide the notification to the management entity when the media becomes available again.

Although embodiments described herein may include a base station as an active node, the systems and/or methods may be applied to any source node connected to a target node over a transport network, where intermediate nodes between the source and target nodes may be traced (e.g., such as in an IP-based and/or MPLS-based network).

In an exemplary embodiment, systems and/or methods described herein may periodically generate a first reference traceroute through a transport network during normal conditions. The first reference traceroute may be a result of a last traceroute command before degradation occurs in the transport network. The systems and/or methods may compare the performance measure to a criterion, and may determine degradation in the transport network when the performance measure matches the criterion. The systems and/or methods may generate a second traceroute through the transport network when degradation occurs in the transport network, and may provide a notification of degradation and information associated with the first and second traceroutes to an associated management entity.

Systems and/or methods described herein may determine transport network router/link failures or degradation based on correlation of traceroutes to a defined end point (e.g., a router) in the transport network. The systems and/or methods may also determine if a transport network failure or degradation resides within the public Internet or within a private intranet.

BRIEF DESCRIPTION OF THE DRAWINGS

FIG. 11 depicts a diagram of an exemplary portion of a database capable of being generated, stored, and/or maintained by the OSS depicted in FIG. 3.

DETAILED DESCRIPTION

The following detailed description refers to the accompanying drawings. The same reference numbers in different drawings may identify the same or similar elements. Also, the following detailed description does not limit the invention.

Embodiments described herein may provide systems and/or methods that determine a source of a fault (or degradation) in a transport network based on information associated with the transport network and detected by one or more base stations associated with access nodes.

Figure 1A:
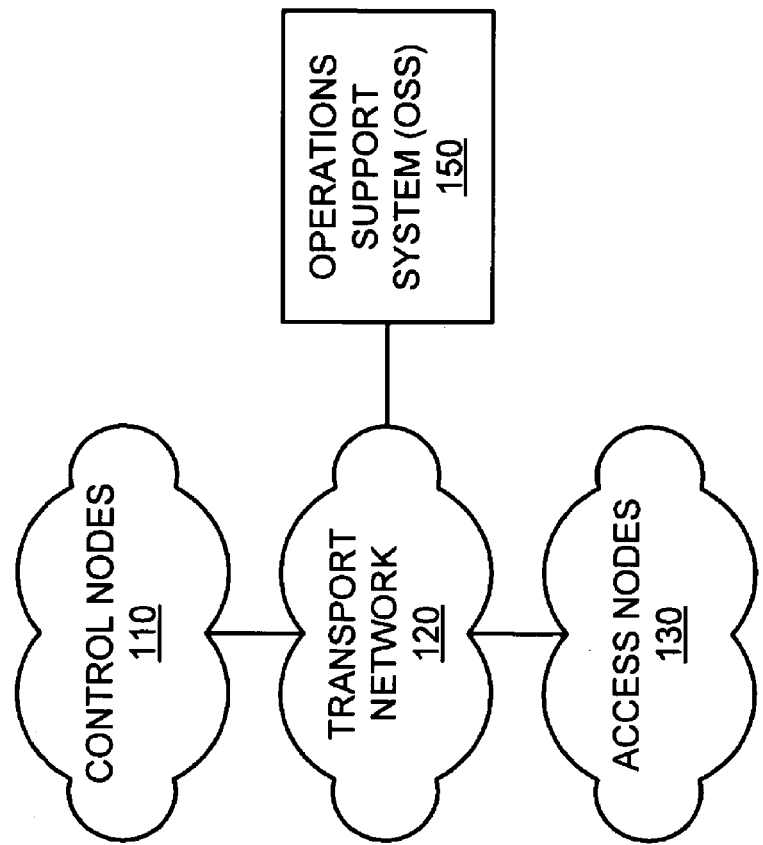
FIGS. 1A and 1B depict diagrams of an exemplary network in which systems and/or methods described herein may be implemented.
Figure 1B:
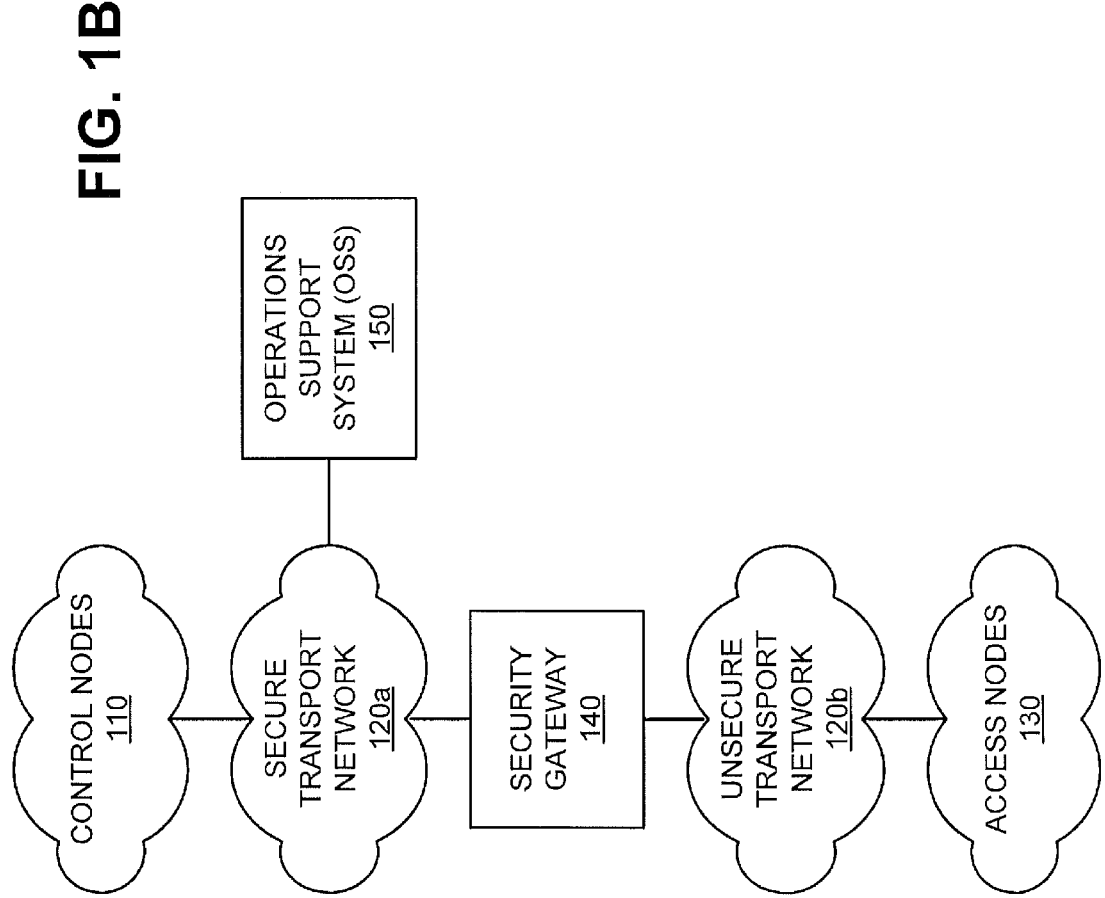

FIGS. 1A and 1B depicts a diagram of an exemplary network 100 in which systems and/or methods described herein may be implemented. As illustrated, network 100 may include control nodes 110, a transport network 120, access nodes 130, a security gateway 140 (FIG. 1B), and an operations support system (OSS) 150. Control nodes 110, transport network 120, access nodes 130, security gateway 140, and/or OSS 150 may interconnect via wired and/or wireless connections. A single depiction of control nodes, transport network, access nodes, security gateway, and OSS has been illustrated in FIG. 1 for simplicity. In practice, there may be more control nodes, transport networks, access nodes, security gateways, and/or OSSs. Also, in some instances, a component in network 100 (e.g., one or more of control nodes 110, transport network 120, access nodes 130, security gateway 140, and/or OSS 150) may perform one or more functions described as being performed by another component or group of components in network 100.

Control nodes 110 may include a network of one or more devices that transfer/receive voice and/or data to a circuit-switched and/or packet-switched network. In one embodiment, control nodes 110 may include, for example, a network that includes one or more of a radio network controller (RNC) (e.g., the control node in a UTRAN radio access network), a core network (CN) node (e.g., a System Architecture Evolution (SAE) gateway), and/or other devices.

Transport network 120 may include a network of one or more devices that connect control nodes 110 to access nodes 130. For example, in one embodiment, transport network 120 may include an IP-based and/or a MPLS-based network. In one embodiment, as shown in FIG. 1B, transport network 120 may include a secure portion and an unsecure portion. Secure transport network 120a may include a secure network, such as an intranet. Unsecure transport network 120b may include an unsecure network, such as the Internet.

Access nodes 130 may include a network of one or more devices for transmitting voice and/or data to user equipment and control nodes 110. For example, in one embodiment, access nodes 130 may include a group of base stations.

Security gateway 140 may include a device (e.g., a gateway, a computer, a router, a switch, a network interface card (NIC), a hub, a bridge, etc.) that terminates secure connections, regulates types of traffic entering and/or exiting a public and/or private network (e.g., control nodes 110, transport network 120, etc.). In one embodiment, for example, security gateway 140 may exercise control over incoming and/or outgoing traffic to or from restricted portions of a network (e.g., control nodes 110).

OSS 150 may include a maintenance entity (e.g., a computer, a computation or communication device, etc.) that, among other things, receives notifications, processes data, and/or provides a user interface. OSS 150 may collect network statistics, may monitor alarms occurring in control nodes 110 and access nodes 130, and may store information about network devices.

Figure 2:
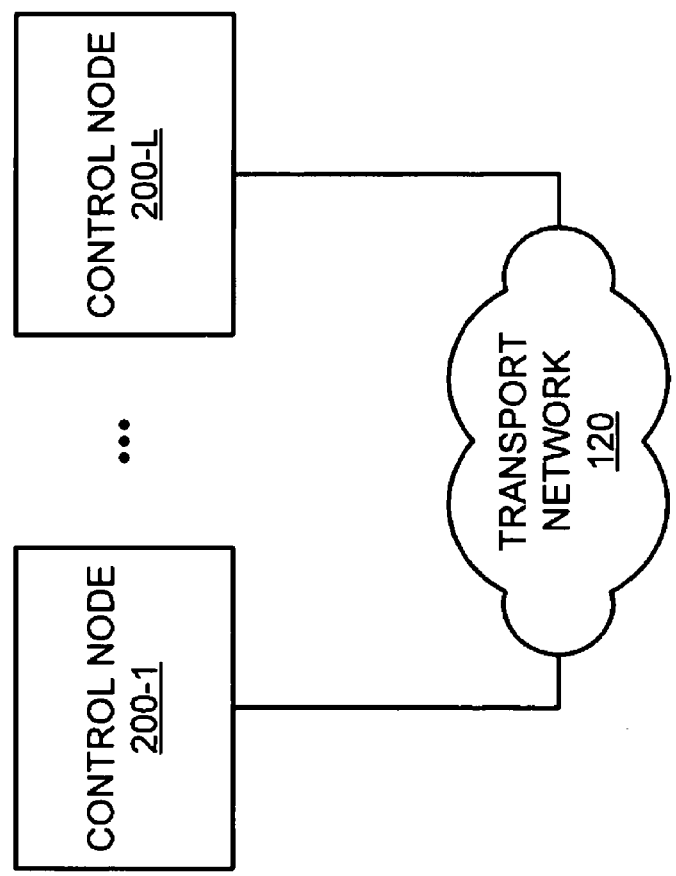
FIG. 2 illustrates a diagram of exemplary components of control nodes of the network depicted in FIG. 1.

FIG. 2 illustrates a diagram of exemplary components of control nodes 110. As shown, control nodes 110 may include one or more nodes 200-1, . . . , 200-L (referred to collectively as "nodes 200" and in some instances, individually as "node 200") connected to transport network 120.

Node 200 may include a device (e.g., a computer, a computation or communication device, etc.) that provides data aggregation, authentication, call control and/or switching, accounting, and/or service invocation functions. The data aggregation function may include a highest level of aggregation in a service provider network. The authentication function may decide whether a user requesting a service is authorized. The call control and/or switching function may decide a future course of a call based on call signaling processing. The accounting function may handle collation and/or processing of charges for data generated by various network nodes. The service invocation function may include invoking a network service based on an explicit action (e.g., a call transfer) or an implicit action (e.g., call waiting). In one embodiment, node 200 may be a radio network controller (RNC), the control node in a UTRAN radio access network. In another embodiment, node 200 may be a core network (CN) node (e.g., a System Architecture Evolution (SAE) gateway).

Although FIG. 2 shows exemplary components of control nodes 110, in other embodiments, control nodes 110 may contain fewer, different, or additional components than depicted in FIG. 2. In still other embodiments, one or more components of control nodes 110 may perform one or more other tasks described as being performed by one or more other components of control nodes 110.

Figure 3:
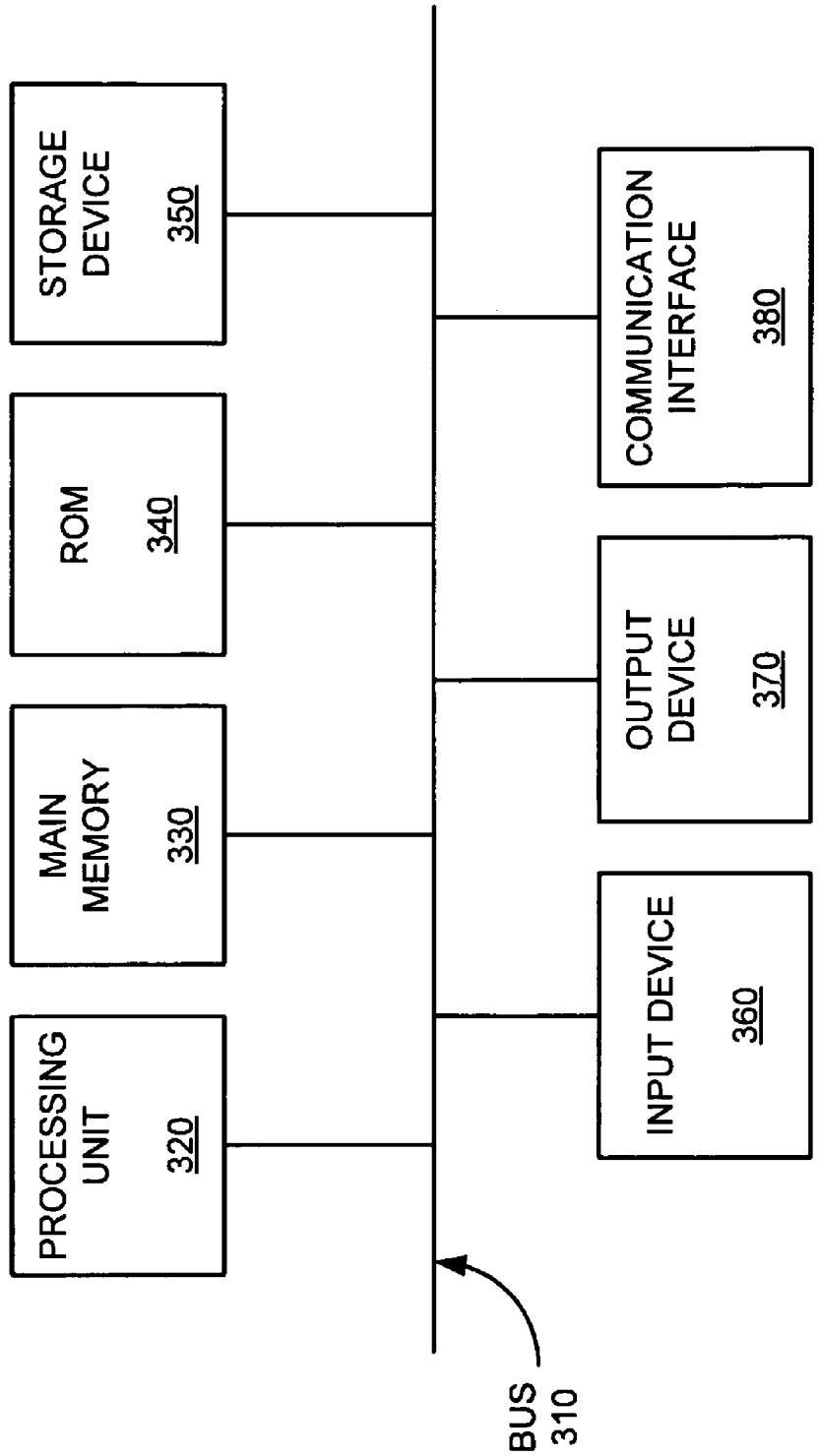
FIG. 3 depicts a diagram of exemplary components of a control node of the control nodes illustrated in FIG. 2 and/or of an operations support system (OSS) of the network illustrated in FIG. 1.

FIG. 3 is an exemplary diagram of a device 300 that may correspond to one of nodes 200 and/or OSS 150. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include a processor, microprocessor, an application specific integrated circuit (ASIC), a field programmable gate array (FPGA), or other type of processing device that may interpret and execute instructions. Main memory 330 may include a random access memory (RAM) or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as control nodes 110.

As described herein, device 300 may perform certain operations in response to processing unit 320 executing software instructions contained in a computer-readable medium, such as main memory 330. A computer-readable medium may be defined as one or more physical and/or logical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, embodiments described herein are not limited to any specific combination of hardware circuitry and software.

Although FIG. 3 shows exemplary components of device 300, in other embodiments, device 300 may contain fewer, different, or additional components than depicted in FIG. 3. In still other embodiments, one or more components of device 300 may perform one or more other tasks described as being performed by one or more other components of device 300.

Figure 4:
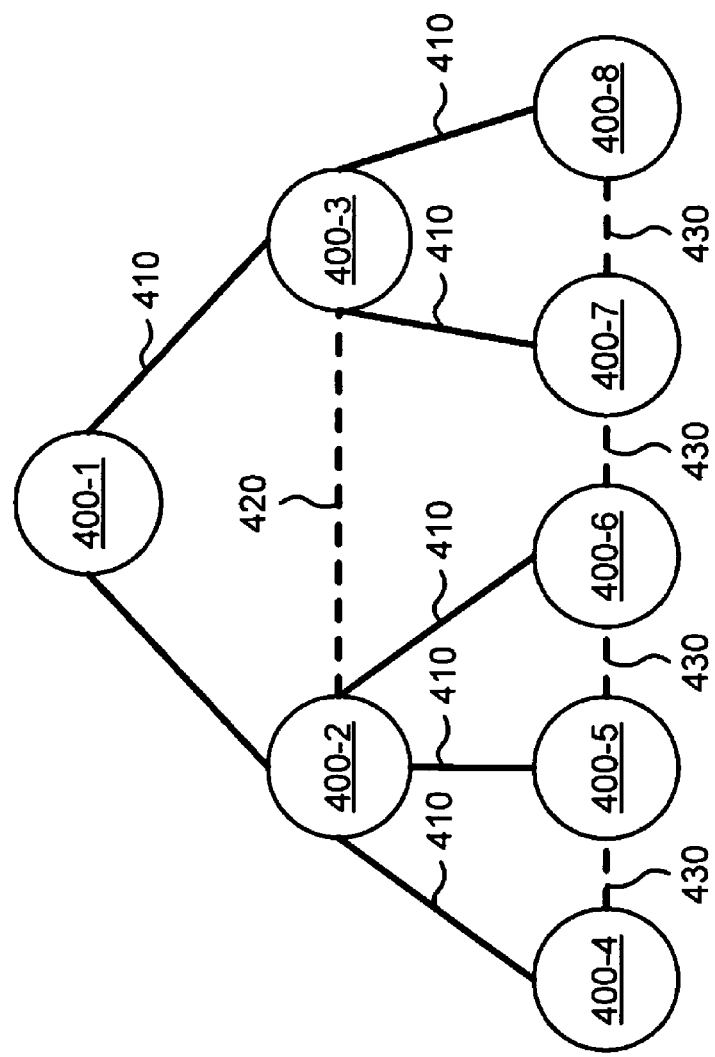
FIG. 4 illustrates a diagram of exemplary components of a transport network of the network depicted in FIG. 1.

FIG. 4 illustrates a diagram of exemplary components of transport network 120. As shown, transport network 120 may include network devices or nodes 400-1, 400-2, . . . , 400-8 (referred to collectively as "network devices 400" and in some instances, individually as "network device 400") interconnected by links 410. While seven network devices 400 and six links 410 are shown in FIG. 4 in a hierarchical topology, more or fewer network devices 400 and/or links 410, possibly in different network topologies than that shown, may be used in other embodiments. For example, transport network 120 may include another link 420 if transport network 120 is arranged in a ring topology, and may further include links 430 if transport network is arranged in a mesh topology. Transport network 120 may also include other components, devices, etc. (not shown in FIG. 4).

Network device 400 may include any network device, such as a computer, a router, a switch, a network interface card (NIC), a hub, a bridge, a gateway, etc. Network devices 400 may be arranged in a variety of topologies, such as a hierarchical topology, a ring topology, a mesh topology, etc. In one exemplary embodiment, when a device (e.g., a base station) of access nodes 130 connects with control nodes 110, the device may be provided a route through transport network 120, via one or more network devices 400. The route provided may depend upon the topology of transport network 120.

Each of links 410-430 may include a path that permits communication among network devices 400, such as wired, wireless, and/or optical connections.

Although FIG. 4 shows exemplary components of transport network 120, in other embodiments, transport network 120 may contain fewer, different, or additional components than depicted in FIG. 4. In still other embodiments, one or more components of transport network 120 may perform one or more other tasks described as being performed by one or more other components of transport network 120.

Figure 5:
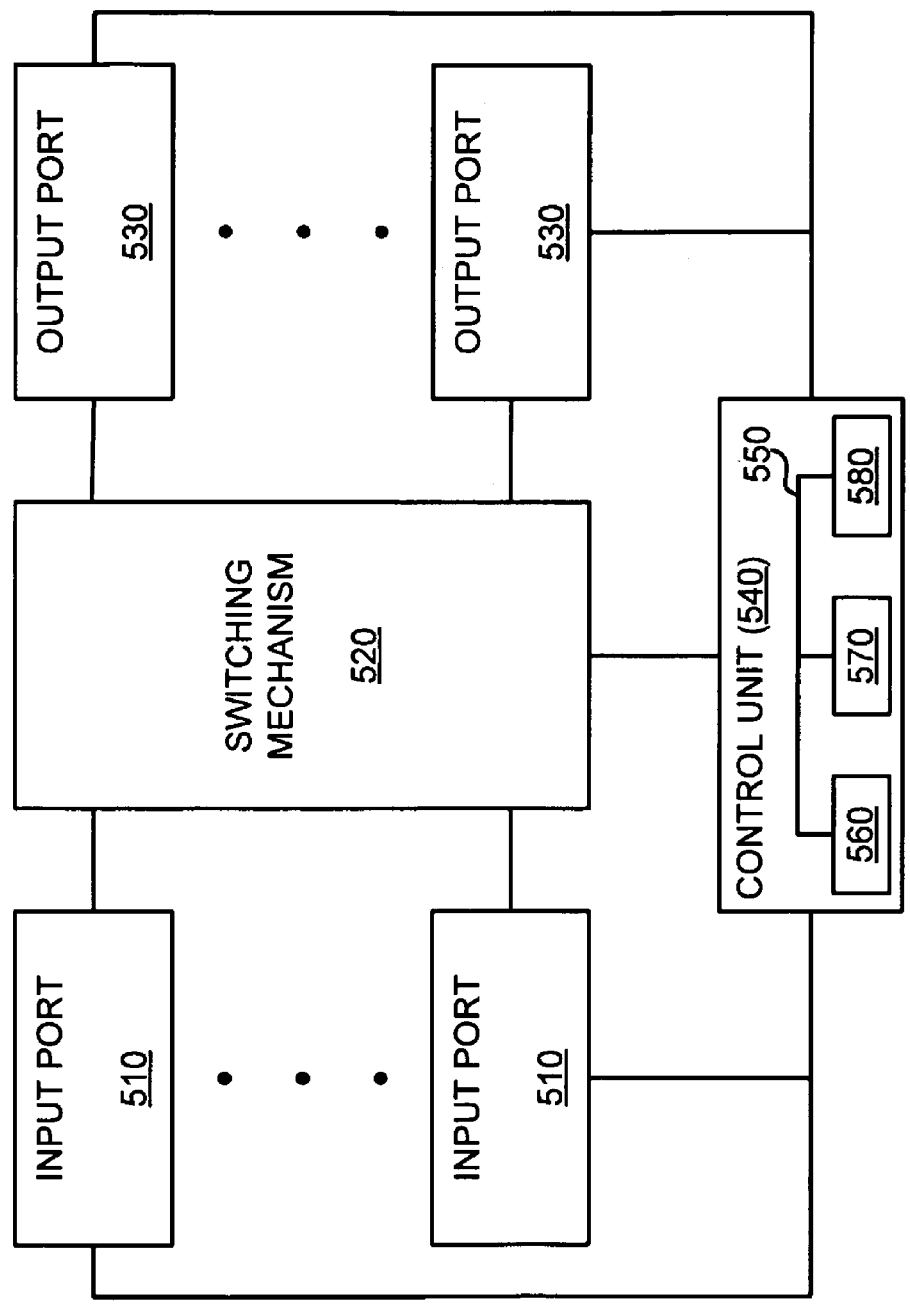
FIG. 5 depicts a diagram of exemplary components of a network device of the transport network illustrated in FIG. 4.

FIG. 5 is an exemplary diagram of a device 500 that may correspond to one of network devices 400. As shown, device 500 may include input ports 510, a switching mechanism 520, output ports 530, and a control unit 540. Input ports 510 may be the point of attachment for a physical link (e.g., link 410) (not shown) and may be the point of entry for incoming data. Switching mechanism 520 may interconnect input ports 510 with output ports 530. Output ports 530 may store data and may schedule data for service on an output link (e.g., link 410) (not shown). Control unit 540 may participate in routing protocols and may create a forwarding table that is used in data forwarding. Control unit 540 may interconnect with input ports 510, switching mechanism 520, and output ports 530. Control unit 540 may compute a forwarding table, implement routing protocols, and/or run software to configure and manage device 500. Control unit 540 may handle any data whose destination address may not be found in the forwarding table.

In one embodiment, control unit 540 may include a bus 550 that may include a path that permits communication among a processor 560, a memory 570, and a communication interface 580. Processor 560 may include a microprocessor or processor that may interpret and execute instructions. Memory 570 may include a random access memory (RAM), a read only memory (ROM) device, a magnetic and/or optical recording medium and its corresponding drive, and/or another type of static and/or dynamic storage device that may store information and instructions for execution by processor 560. Communication interface 580 may include any transceiver-like mechanism that enables control unit 540 to communicate with other devices and/or systems.

As described herein, device 500 may perform certain operations in response to processor 560 executing software instructions contained in a computer-readable medium, such as memory 570. The software instructions may be read into memory 570 from another computer-readable medium, such as a data storage device, or from another device via communication interface 580. The software instructions contained in memory 570 may cause processor 560 to perform processes described herein. Alternatively, hardwired circuitry may be used in place of or in combination with software instructions to implement processes described herein. Thus, embodiments described herein are not limited to any specific combination of hardware circuitry and software.

Although FIG. 5 shows exemplary components of device 500, in other embodiments, device 500 may contain fewer, different, or additional components than depicted in FIG. 5. In still other embodiments, one or more components of device 500 may perform one or more other tasks described as being performed by one or more other components of device 500.

Figure 6:
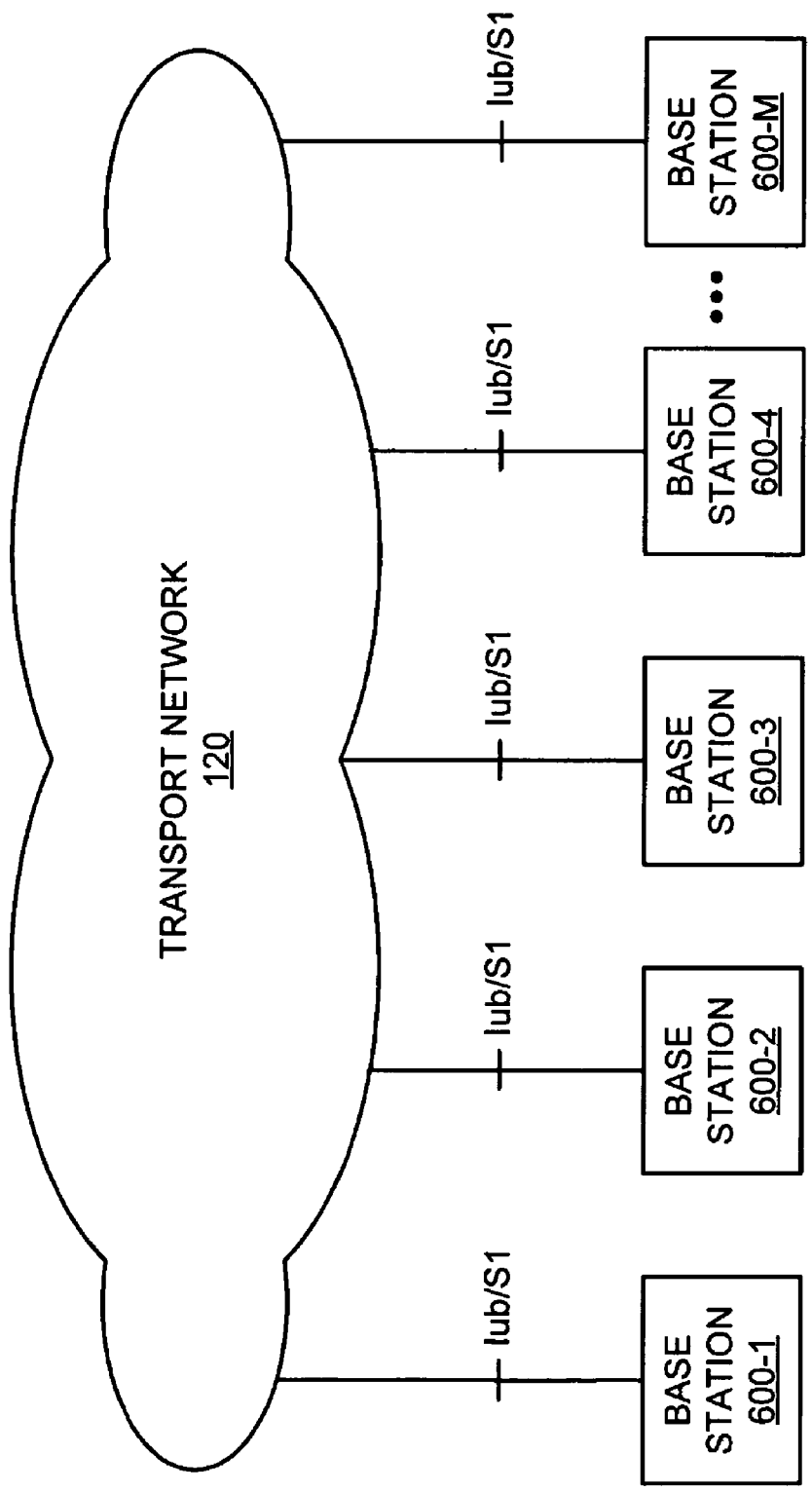
FIG. 6 illustrates a diagram of exemplary components of access nodes of the network depicted in FIG. 1.

FIG. 6 illustrates a diagram of exemplary components of access nodes 130. As shown, access nodes 130 may include a group of base stations 600-1 through 600-M (referred to collectively as "base stations 600" and in some instances, individually as "base station 600") connected to transport network 120. Five base stations 600 connected to a common transport network 120 are shown in FIG. 6 for simplicity. In practice, there may be more or fewer base stations communicating with control nodes 110 via transport network 120.

Base stations 600 (also referred to as "Node Bs" or "eNodeBs") may include one or more devices that receive voice and/or data and transmit that voice and/or data to user equipment (not shown) via an air interface. Base stations 600 may also include one or more devices that receive voice and/or data from user equipment over an air interface and transmit that voice and/or data to control nodes 110 or other user equipment. As illustrated in FIG. 6, transport network 120 may connect to base stations 600 via network interface (e.g., Ethernet, asynchronous transfer mode (ATM), etc.), and may communicate with respective control nodes via an application protocol (e.g., Iub, Iu, S1, etc.).

Although FIG. 6 shows exemplary components of access nodes 130, in other embodiments, access nodes 130 may contain fewer, different, or additional components than depicted in FIG. 6. In still other embodiments, one or more components of access nodes 130 may perform one or more other tasks described as being performed by one or more other components of access nodes 130.

Figure 7:
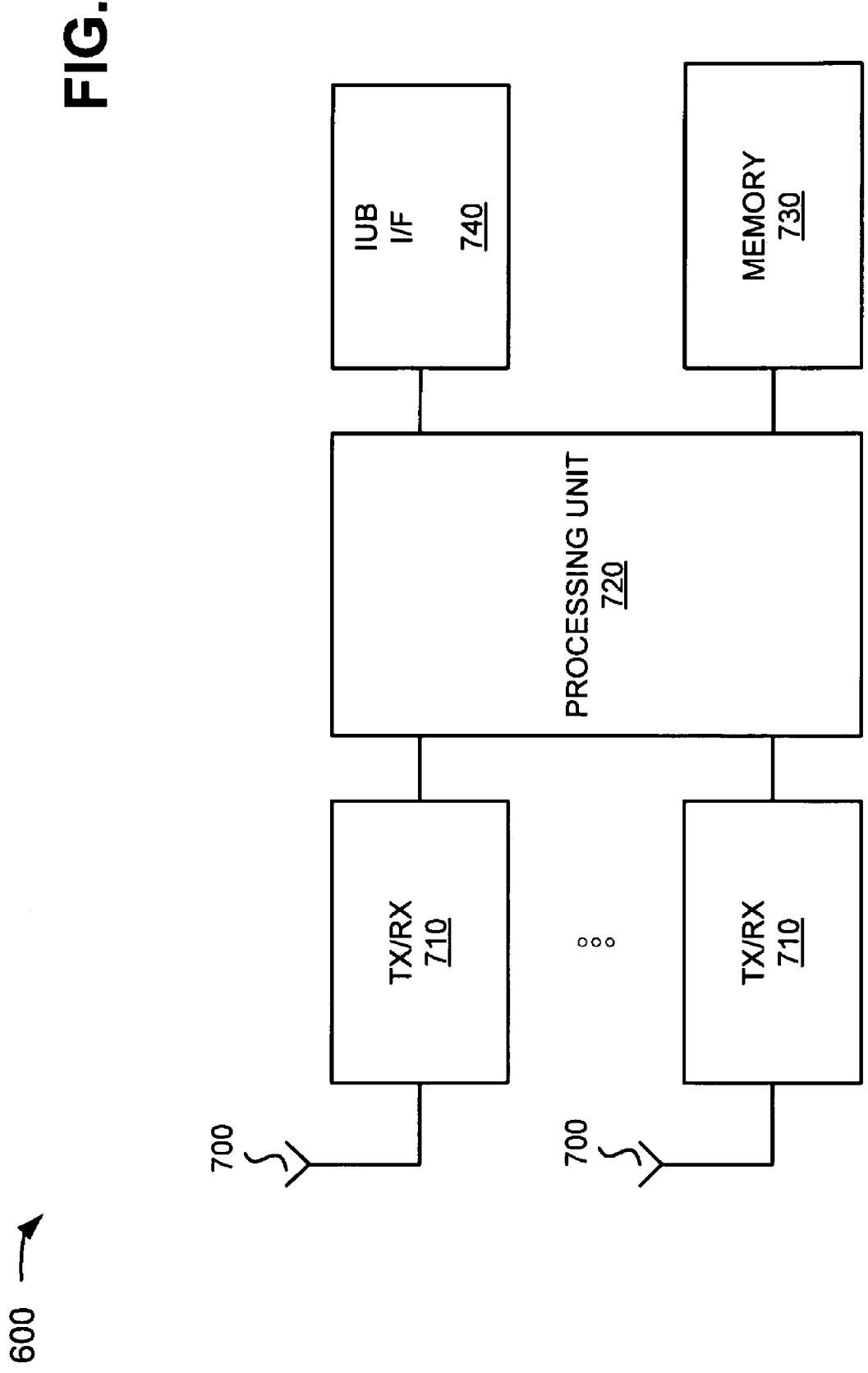
FIG. 7 depicts a diagram of exemplary components of a base station of the access nodes illustrated in FIG. 6.

FIG. 7 depicts a diagram of exemplary components of base station 600. As shown, base station 600 may include antennas 700, transceivers (TX/RX) 710, a processing unit 720, a memory 730, and an Iub interface (I/F) 740.

Antennas 700 may include one or more directional and/or omni-directional antennas. Transceivers 710 may be associated with antennas 700 and may include transceiver circuitry for transmitting and/or receiving symbol sequences in a network, such as access nodes 130, via antennas 700.

Processing unit 720 may control the operation of base station 600. Processing unit 720 may also process information received via transceivers 710 and Iub interface 740. Processing unit 720 may further measure quality and strength of a connection and determine the frame error rate (FER), and transmit this information. The processing may include, for example, data conversion, forward error correction (FEC), rate adaptation, Wideband Code Division Multiple Access (WCDMA) spreading/dispreading, and quadrature phase shift keying (QPSK) modulation, etc. In addition, processing unit 720 may generate control messages and/or data messages (e.g., HS-DSCH DATA FRAMES) and cause those control messages and/or data messages to be transmitted via transceivers 710 and/or Iub interface 740. Processing unit 720 may also process control messages and/or data messages received from transceivers 710 and/or Iub interface 740.

Memory 730 may include a random access memory (RAM), a read only memory (ROM) device, a magnetic and/or optical recording medium and its corresponding drive, and/or another type of static and/or dynamic storage device that may store information and instructions for execution by processing unit 720.

Iub interface 740 may include one or more line cards that allow base station 600 to transmit data to and receive data.

As described herein, base station 600 may perform certain operations in response to processing unit 720 executing software instructions contained in a computer-readable medium, such as memory 730. The software instructions may be read into memory 730 from another computer-readable medium, such as a data storage device, or from another device via transceivers 710. The software instructions contained in memory 730 may cause processing unit 720 to perform processes described herein. Alternatively, hardwired circuitry may be used in place of or in combination with software instructions to implement processes described herein. Thus, embodiments described herein are not limited to any specific combination of hardware circuitry and software.

Although FIG. 7 shows exemplary components of base station 600, in other embodiments, base station 600 may contain fewer, different, or additional components than depicted in FIG. 7. In still other embodiments, one or more components of base station 600 may perform one or more other tasks described as being performed by one or more other components of base station 600.

Figure 8:
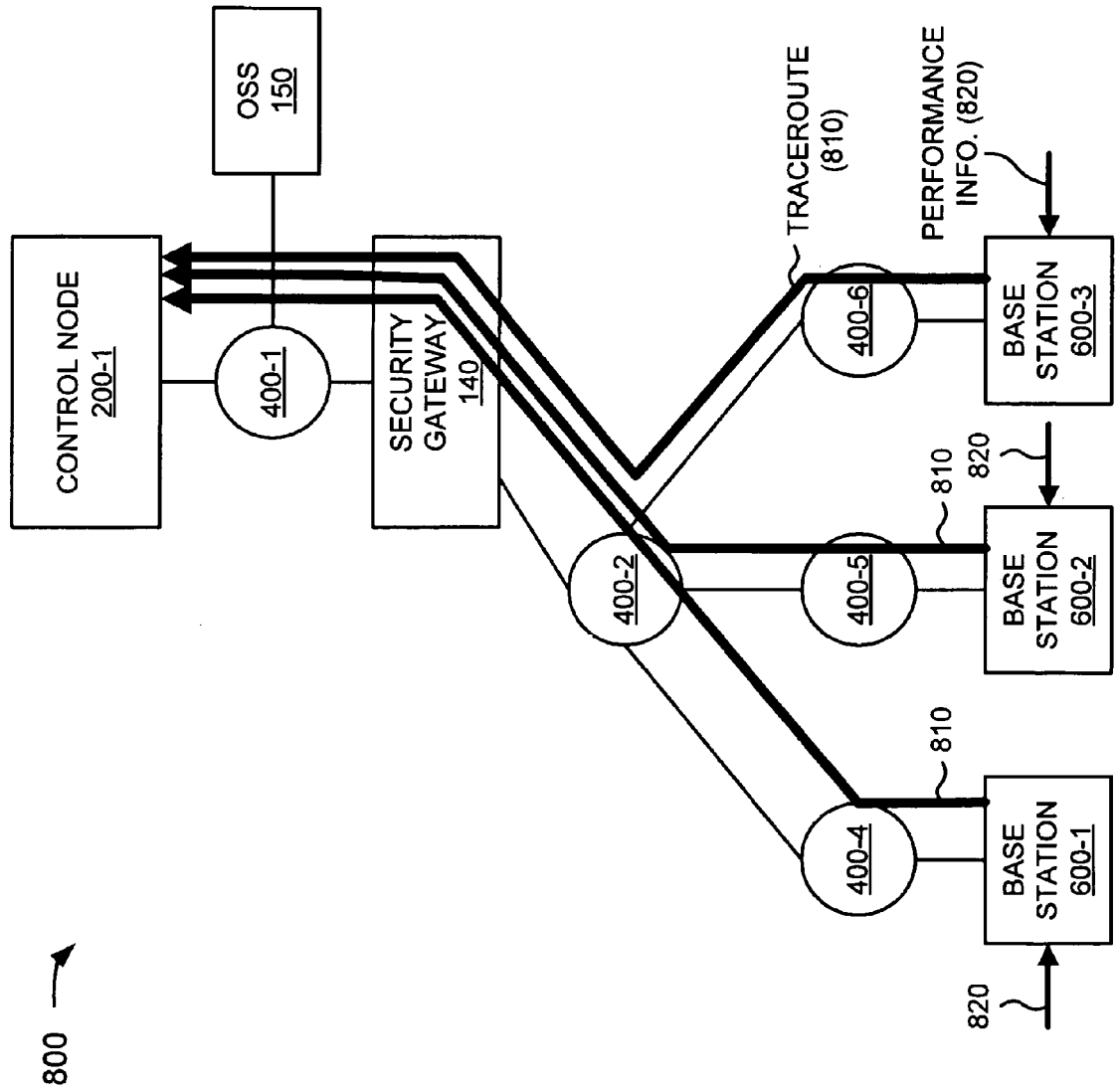
FIG. 8 illustrates an exemplary portion of the network depicted in FIG. 1 and exemplary interactions among components of the network portion.

FIG. 8 depicts a diagram of an exemplary portion 800 of network 100 and exemplary interactions among components of network portion 800. As illustrated, network portion 800 may include security gateway 140, OSS 150, node 200-1, network devices 400-1, 400-2, 400-4, 400-5, and 400-6, and base stations 600-1, 600-2, and 600-3. Security gateway 140, OSS 150, node 200-1, network devices 400-1, 400-2, 400-4, 400-5, and 400-6, and base stations 600-1, 600-2, and 600-3 may include the features described above in connection with, for example, FIGS. 2-7. In one embodiment, network device 400-1 may be provided in the secure portion of transport network 120, and network devices 400-2, 400-4, 400-5, and 400-6 may be provided in the unsecure portion of transport network 120. OSS 150 may connect to transport network 120 (e.g., via network device 400-1 provided in the secure portion of transport network 120).

Base stations 600-1, 600-2, and 600-3 may continuously monitor performance of transport network 120 (e.g., network devices 400-1, 400-2, 400-4, 400-5, and 400-6) for performance measures, such as latency, jitter, packet losses, etc. In one embodiment, as shown in FIG. 8, at certain intervals, base stations 600-1, 600-2, and 600-3 may execute traceroutes 810 towards a known control node (e.g., node 200-1) if the performance of transport network 120 is acceptable. For example, base stations 600-1, 600-2, and 600-3 may generate traceroutes 810 towards security gateway 140 and node 200-1, and may monitor a performance measure of transport network 120 based on performance information 820 received. Performance information 820 may include information associated with transport network 120, such as latency, jitter, packet losses, etc. associated with transport network 120, end point information associated with traceroutes 810, time stamp information associated with traceroutes 810, etc. Base stations 600-1, 600-2, and 600-3 may compare performance information 820 to a criterion (e.g., a threshold), and may determine if there is degradation in transport network 120 when performance information 820 matches the criterion (e.g., exceeds a threshold). Traceroutes 810 may enable base stations 600-1, 600-2, and 600-3 to capture any modifications to the topology of transport network 120.

In one exemplary embodiment, if transport network 120 includes an unsecure portion (e.g., the Internet) and a secure portion (e.g., an intranet), traceroutes 810 from each of base stations 600-1, 600-2, and 600-3 may be generated twice. For example, traceroute 810 may be generated over the Internet (unsecure) portion of transport network 120, and may be generated over the intranet (secure) portion of transport network 120 (e.g., via an IP security (Ipsec) tunnel directed towards security gateway 140 and the intranet). This may ensure that base stations 600-1, 600-2, and 600-3 capture an entire transport route.

In one embodiment, at each bearer request from control nodes 110, base stations 600-1, 600-2, and 600-3 may determine if a control node corresponding to the request is included in a traceroute list stored in base stations 600-1, 600-2, and 600-3 (e.g., in memory 730). If the corresponding control node is not provided in the list and performance of transport network 120 is within acceptable limits, a traceroute may be generated towards the corresponding (e.g., newly discovered) control node, and information associated with the traceroute may be stored in the list.

Although FIG. 8 shows exemplary components of network portion 800, in other embodiments, network portion 800 may contain fewer, different, or additional components than depicted in FIG. 8. In still other embodiments, one or more components of network portion 800 may perform one or more other tasks described as being performed by one or more other components of network portion 800.

Figure 9:
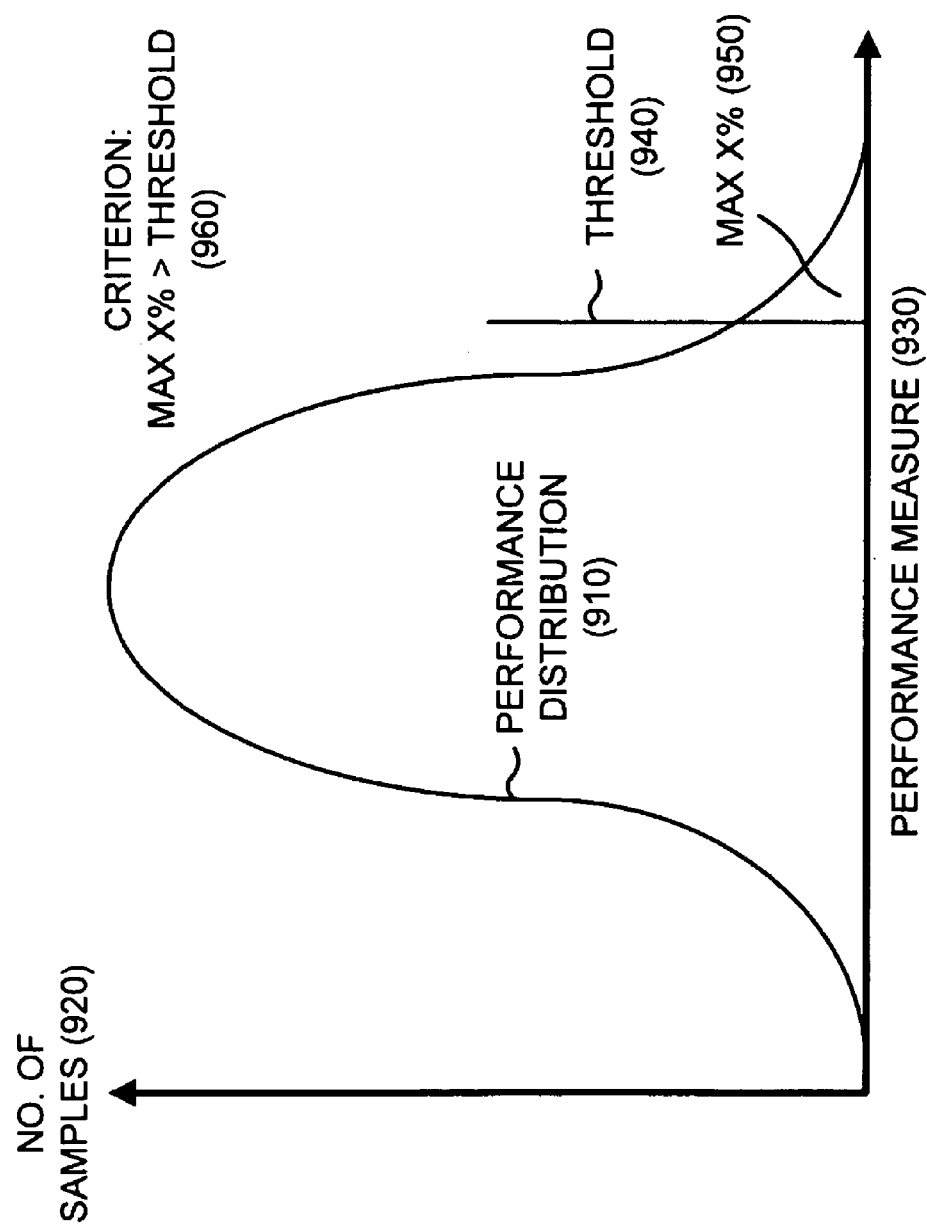
FIG. 9 depicts an exemplary graph of a performance distribution and associated criterion capable of being utilized by the base station illustrated in FIG. 7.

FIG. 9 depicts an exemplary graph 900 of a performance distribution 910 and associated criterion capable of being utilized by base stations 600-1 and 600-2 when comparing performance information 820 to a criterion (e.g., a threshold). As shown, graph 900 may include performance distribution 910, a number of samples axis 920 (e.g., the y axis), and a performance measure axis 930 (e.g., the x axis).

Performance distribution 910 may be based on performance measure information (e.g., performance information 820) associated with latency, jitter, packet losses, etc. The performance measure may provide a statistical significance of the measured results (e.g., by selecting a proper sample size with regard to a number of transport links and a number of measurement samples) for connections to a particular control node (e.g., node 200-1).

Number of samples axis 920 may provide an indication of a number of measurement samples (e.g., received by base stations 600-1 and 600-2). Performance measure axis 930 may provide an indication of a performance measure (e.g., performance information 820 received by base stations 600-1 and 600-2).

As further shown in FIG. 9, a threshold 940, a maximum percentage 950, and a criterion 960 may be associated with performance distribution 910. Threshold 940 may provide a limit on a performance measure (e.g., latency should be below a certain threshold, jitter should be below another threshold, etc.) before degradation of transport network 120 is determined to occur. In other embodiments, threshold 940 may provide a minimum value for the performance measure. Maximum percentage 950 may provide an indication of performance distribution 910 that exceeds threshold 940. Criterion 960 may include a comparison of performance distribution 910 to threshold 940. For example, if maximum percentage 950 is greater than threshold 940, criterion 960 may determine that degradation of transport network 120 is occurring.

Figure 10:
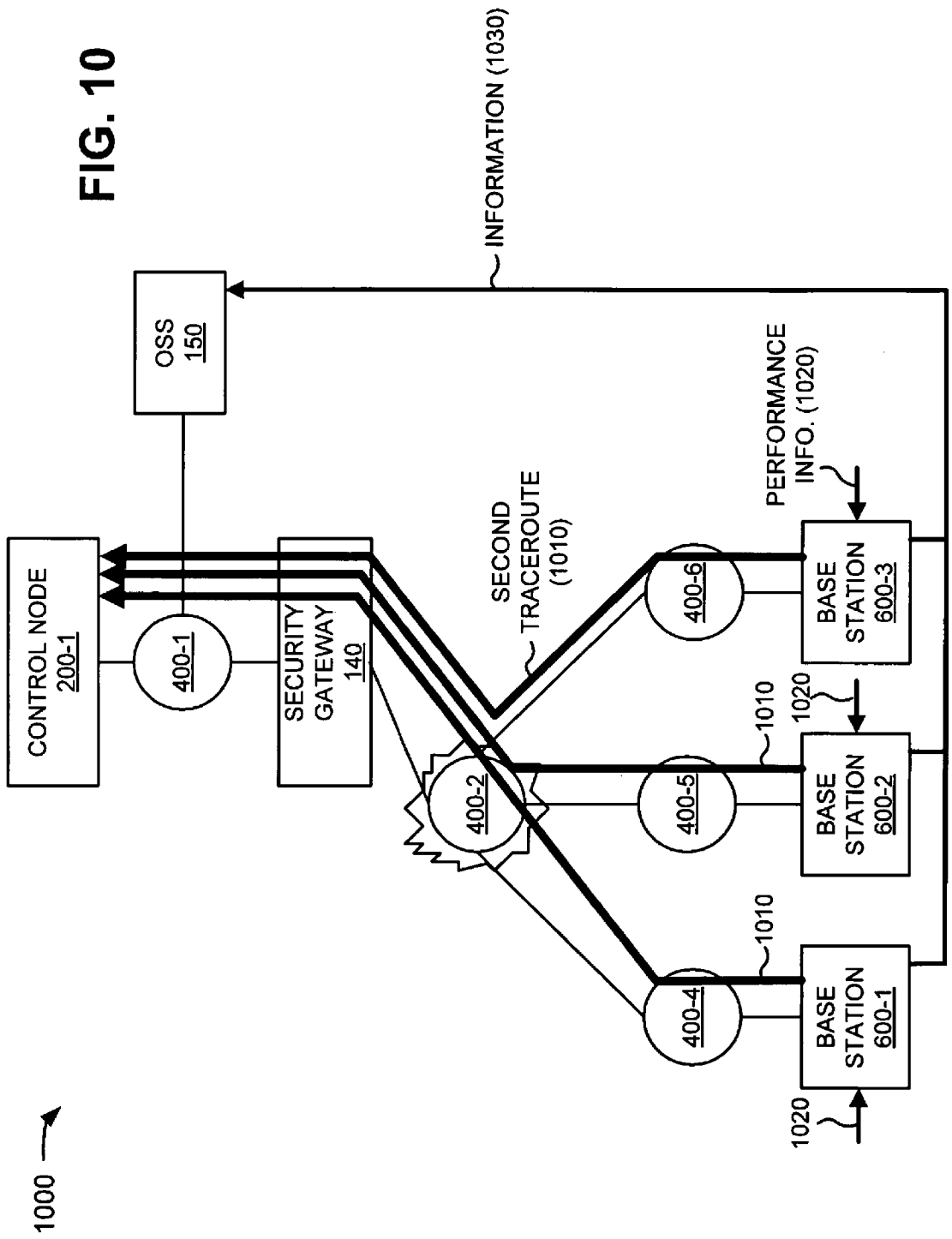
FIG. 10 illustrates another exemplary portion of the network depicted in FIG. 1 and exemplary interactions among components of the network portion.

FIG. 10 illustrates another exemplary portion 1000 of network 100 and exemplary interactions among components of network portion 1000. As illustrated, network portion 1000 may include security gateway 140, OSS 150, node 200-1, network devices 400-1, 400-2, 400-4, 400-5, and 400-6, and base stations 600-1, 600-2, and 600-3. Security gateway 140, OSS 150, node 200-1, network devices 400-1, 400-2, 400-4, 400-5, and 400-6, and base stations 600-1, 600-2, and 600-3 may include the features described above in connection with, for example, FIGS. 2-7. In one embodiment, network device 400-1 may be provided in the secure portion of transport network 120, and network devices 400-2, 400-4, 400-5, and 400-6 may be provided in the unsecure portion of transport network 120. OSS 150 may connect to transport network 120 (e.g., via network device 400-1 provided in the secure portion of transport network 120).

When a degradation of performance of transport network 120 is detected by base stations 600-1, 600-2, and 600-3 (e.g., based on any implemented performance measures, such as latency, jitter, packet loss, etc.), base stations 600-1, 600-2, and 600-3 may each generate second traceroutes 1010 towards security gateway 140 and node 200-1, and may monitor a performance measure of transport network 120 based on performance information 1020 received. Performance information 1020 may include information associated with transport network 120, such as latency, jitter, packet losses, etc. associated with transport network 120, end point information associated with traceroutes 1010, time stamp information associated with traceroutes 1010, etc. In one embodiment, traceroutes 1010 from each of base stations 600-1, 600-2, and 600-3 may be generated twice as described above in connection with traceroutes 810.

As further shown in FIG. 10, base stations 600-1, 600-2, and 600-3 may provide, to OSS 150, notifications of degradation of transport network 120, information associated with traceroutes 810 and 1010, end point information associated with traceroutes 810 and 1010, time stamp information associated with traceroutes 810 and 1010, etc., as indicated by reference number 1030 (collectively referred to as "information 1030"). Although FIG. 10 shows (for clarity) information 1030 being provided directly from base stations 600-1, 600-2, and 600-3 to OSS 150, information 1030 may be physically routed from base stations 600-1, 600-2, and 600-3 to OSS 150 via transport network 120 (e.g., via network devices 400-1, 400-2, 400-4, 400-5, and 400-6) in a manner similar to the manner traceroutes 810 and 1010 are routed from base stations 600-1, 600-2, and 600-3 to OSS 150.

OSS 150 may receive information 1030 from base stations 600-1, 600-2, and 600-3, and may store information 1030 (e.g., in a database). OSS 150 may correlate information associated with traceroutes 810 and 1010 within a certain time frame. The time frame may be configured to enable failures (or degradation) to be associated in time. OSS 150 may determine a device and/or a link of transport network 120 that is a source of degradation based on correlation of the information associated with traceroutes 810 and 1010. For example, as shown in FIG. 10, network device 400-2 may be a source of degradation, and OSS 150 may determine that network device 400-2 is a source of degradation based on correlation of information associated with traceroutes 810 and 1010.

In one embodiment, OSS 150 may provide a notification of the source of degradation (e.g., a device and/or a link of transport network 120) to a user (e.g., a system administrator in charge of maintaining network 100). Alternatively and/or additionally, OSS 150 may provide the user with a notification that the correlation of information associated with traceroutes 810 and 1010 is complete, and the user may manually analyze the correlation of information associated with traceroutes 810 and 1010. OSS 150 may remove information 1030 from the database after a defined time period. Alternatively and/or additionally, OSS 150 may provide the user with a notification of expiration of the defined time period, and the user may manually delete information 1030 from the database.

Although FIG. 10 shows exemplary components of network portion 1000, in other embodiments, network portion 1000 may contain fewer, different, or additional components than depicted in FIG. 10. In still other embodiments, one or more components of network portion 1000 may perform one or more other tasks described as being performed by one or more other components of network portion 1000.

FIG. 11 depicts a diagram of an exemplary portion 1100 of a database. In one embodiment, database portion 1100 may be generated, stored, and/or maintained by OSS 150. In other embodiments, database portion 1100 may be generated, stored, and/or maintained by a device other than or in addition to OSS 150. As shown in FIG. 11, database portion 1100 may include a base station identification (ID) field 1110, a notification field 1120, a traceroute information field 1130, an end point information field 1140, a time stamp field 1150, and/or a variety of entries 1160 associated with fields 1110-1150.

Base station ID field 1110 may include identification information associated with a base station providing information 1030 (e.g., base stations 600-1, 600-2, and 600-3). For example, base station ID field 1110 may include entries for "BS 600-1," "BS 600-2," "BS 600-3," etc. Each of the identifications provided in base station ID field 1110 may include a string of letters, digits, and/or symbols that may be used to identify a base station.

Notification field 1120 may include notifications provided by and associated with the base stations identified in base station ID field 1110. For example, notification field 1120 may include entries for a "pre-degradation" notification (e.g., a notification provided by a base station before degradation is detected in transport network 120) and a "post-degradation" notification (e.g., a notification provided by a base station after degradation is detected).

Traceroute information field 1130 may include information associated with traceroutes (e.g., traceroutes 810 and 1010) generated by the base stations identified in base station ID field 1110. For example, traceroute information field 1130 may indicate that traceroutes provided by BS 600-1, BS 600-2, and BS 600-3 are "good" or that traceroutes provided by BS 600-1, BS 600-2, and BS 600-3 are experiencing "degradation."

End point information field 1140 may include end point information associated with traceroutes generated by the base stations identified in base station ID field 1110. For example, end point information field 1140 may indicate that a first traceroute provided by BS 600-1 includes three end points (e.g., network devices 400-4, 400-2, and 400-1), that a first traceroute provided by BS 600-2 includes three end points (e.g., network devices 400-5, 400-2, and 400-1), and that a first traceroute provided by BS 600-3 includes three end points (e.g., network devices 400-6, 400-2, and 400-1). End point information field 1140 may indicate that a second traceroute provided by BS 600-1 includes three end points (e.g., network devices 400-4, 400-2, and 400-1), that a second traceroute provided by BS 600-2 includes three end points (e.g., network devices 400-5, 400-2, and 400-1), and that a second traceroute provided by BS 600-3 includes three end points (e.g., network devices 400-6, 400-2, and 400-1). As indicated by reference number 1170 in FIG. 11, end point information field 1140 may be used (e.g., by OSS 150) to correlate traceroutes and determine that a source of degradation may include network device 400-1 and/or network device 400-2.

Time stamp field 1150 may include time stamp information associated with traceroutes generated by the base stations identified in base station ID field 1110. For example, time stamp field 1150 may indicate that the first traceroutes provided by BS 600-1, BS 600-2, and BS 600-3 are generated at a first time (e.g., "TIME1"), a second time (e.g., "TIME2"), and a third time (e.g., "TIME3"), respectively, prior to degradation, and that the second traceroutes provided by BS 600-1, BS 600-2, and BS 600-3 are generated at a fourth time (e.g., "TIME4"), a fifth time (e.g., "TIME5"), and a sixth time (e.g., "TIME6"), respectively, after degradation.

In one embodiment, OSS 150 may determine a source of a failure by counting a number of occurrences in the reported notifications for each router instance received during a relevant time interval. The number of occurrences may determine a probability of being the source of the failure.

Although FIG. 11 shows exemplary elements of database portion 1100, in other embodiments, database portion 1100 may contain fewer, different, or additional elements than depicted in FIG. 11.

Figure 12:
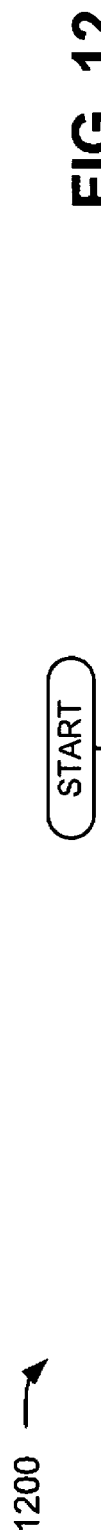
FIGS. 12-14 depict flow charts of exemplary processes for determining a source of degradation in a transport network according to embodiments described herein.
Figure 13:
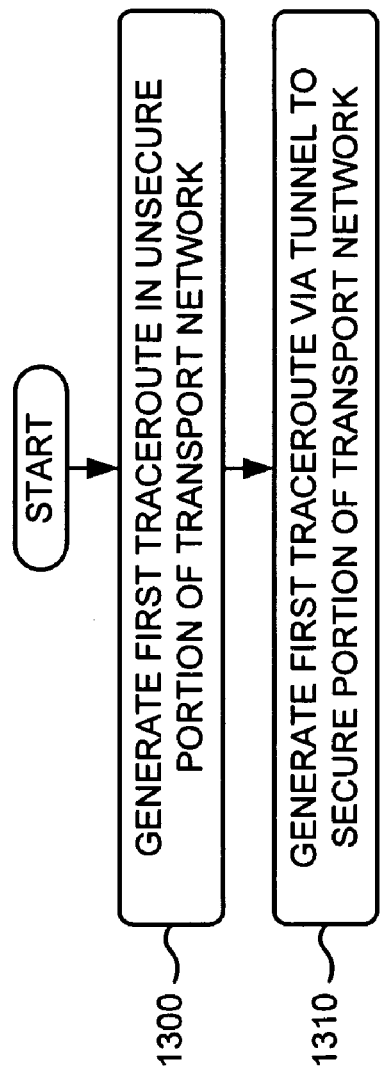

FIGS. 12 and 13 depict flow charts of an exemplary process 1200 for determining a source of degradation in a transport network according to embodiments described herein. In one embodiment, process 1200 may be performed by hardware and/or software components of base stations 600. In other embodiments, process 1200 may be performed by hardware and/or software components of base stations 600 in combination with hardware and/or software components of another device or group of devices (e.g., communicating with base stations 600).

As illustrated in FIG. 12, process 1200 may begin with periodic generation of a first traceroute through a transport network (block 1210), and monitoring a performance measure associated with the transport network (block 1220). For example, in embodiments described above in connection with FIG. 8, at certain intervals, base stations 600-1, 600-2, and 600-3 may execute traceroutes 810 towards a known control node (e.g., node 200-1) if the performance of transport network 120 is acceptable. For example, base stations 600-1, 600-2, and 600-3 may generate traceroutes 810 towards security gateway 140 and node 200-1, and may monitor a performance measure of transport network 120 based on performance information 820 received. Performance information 820 may include information associated with latency, jitter, packet losses, etc., end point information associated with traceroutes 810, time stamp information associated with traceroutes 810, etc.

Returning to FIG. 12, the performance measure may be compared to a criterion (block 1230), and degradation in the transport network may be determined when the performance measure matches the criterion (block 1240). For example, in embodiments described above in connection with FIG. 8, base stations 600-1, 600-2, and 600-3 may compare performance information 820 to a criterion (e.g., a threshold), and may determine if there is degradation in transport network 120 when performance information 820 matches the criterion (e.g., exceeds a threshold). In one exemplary embodiment, blocks 1210-1230 may be performed in parallel, and, if the performance measure does not match the criterion (block 1230), process 1200 may re-execute blocks 1210-1230 in parallel.

As further shown in FIG. 12, a second traceroute may be generated through the transport network when degradation occurs in the transport network (block 1250), and a notification of the degradation and/or information associated with the first and second traceroutes may be provided to a device associated with the transport network (block 1260). For example, in embodiments described above in connection with FIG. 10, when a degradation of performance of transport network 120 is detected by base stations 600-1, 600-2, and/or 600-3 (e.g., based on any implemented performance measures, such as latency, jitter, packet loss, etc.), base stations 600-1, 600-2, and 600-3 may each generate second traceroutes 1010 towards security gateway 140 and node 200-1, and may monitor a performance measure of transport network 120 based on performance information 1020 received. Performance information 1020 may include information associated with latency, jitter, packet losses, etc., end point information associated with traceroutes 1010, time stamp information associated with traceroutes 1010, etc. Base stations 600-1, 600-2, and 600-3 may provide, to OSS 150, notifications of degradation of transport network 120, information associated with traceroutes 810 and 1010, end point information associated with traceroutes 810 and 1010, time stamp information associated with traceroutes 810 and 1010, etc., as indicated by reference number 1030.

Process block 1210 and/or process block 1250 may include the process blocks depicted in FIG. 13. As illustrated in FIG. 13, process blocks 1210/1250 may include generating the first traceroute in unsecure portion of the transport network (block 1300), and generating the first traceroute via a tunnel to a secure portion of the transport network (block 1310). For example, in embodiments described above in connection with FIGS. 8 and 10, if transport network 120 includes an unsecure portion (e.g., the Internet) and a secure portion (e.g., an intranet), traceroutes 810 from each of base stations 600-1, 600-2, and 600-3 may be generated twice. In one example, traceroute 810 may be generated over the Internet (unsecure) portion of transport network 120, and may be generated over the intranet (secure) portion of transport network 120 (e.g., via an IP security (Ipsec) tunnel directed towards security gateway 140 and the intranet). This may ensure that base stations 600-1, 600-2, and 600-3 capture an entire transport route. Similarly, traceroutes 1010 from each of base stations 600-1, 600-2, and 600-3 may be generated twice.

Figure 14:
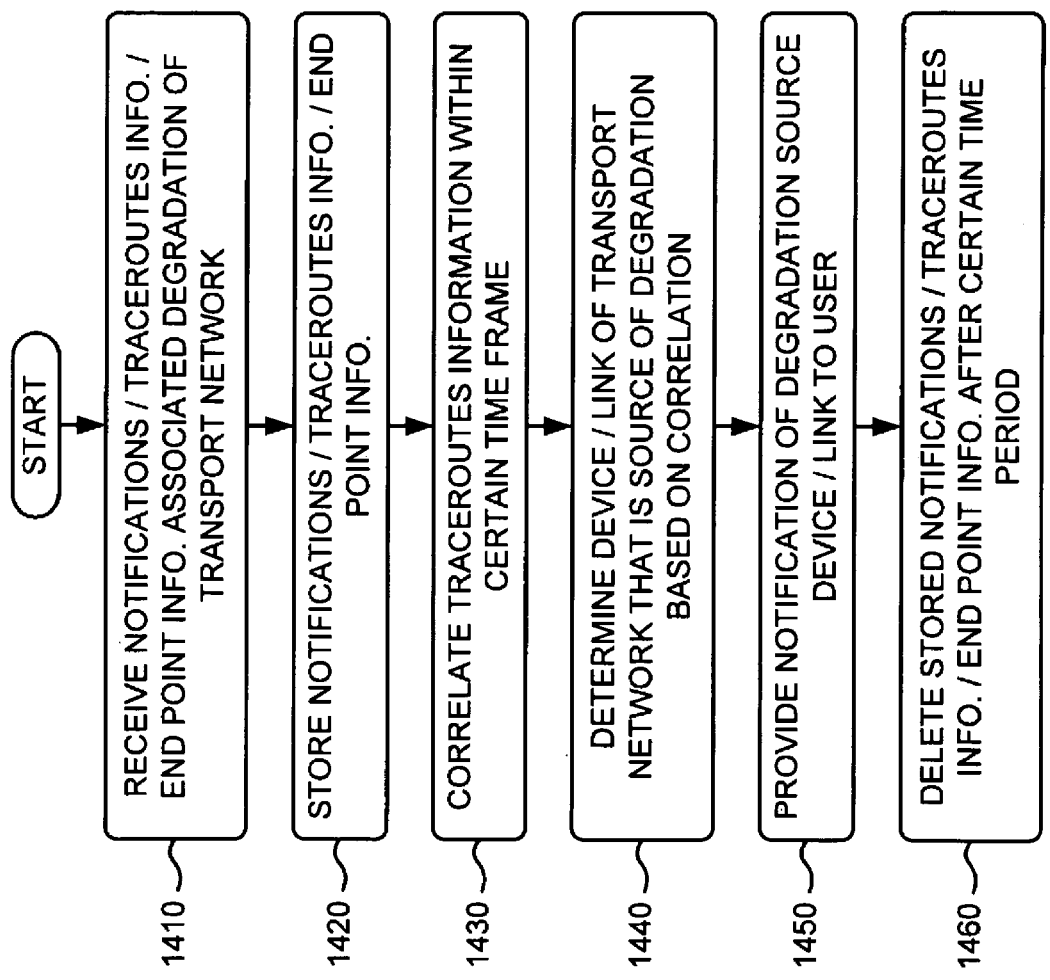

FIG. 14 depicts a flow chart of an exemplary process 1400 for determining a source of degradation in a transport network according to embodiments described herein. In one embodiment, process 1400 may be performed by hardware and/or software components of OSS 150. In other embodiments, process 1400 may be performed by hardware and/or software components of OSS 150 in combination with hardware and/or software components of another device or group of devices (e.g., communicating with OSS 150).

As illustrated in FIG. 14, process 1400 may include receiving notifications, traceroutes information, and/or end point information associated with degradation of a transport network (block 1410), and storing the notifications, traceroutes information, and/or the end point information (block 1420). For example, in embodiments described above in connection with FIG. 10, base stations 600-1, 600-2, and 600-3 may provide, to OSS 150, notifications of degradation of transport network 120, information associated with traceroutes 810 and 1010, end point information associated with traceroutes 810 and 1010, time stamp information associated with traceroutes 810 and 1010, etc., as indicated by reference number 1030 (collectively referred to as "information 1030"). OSS 150 may receive information 1030 from base stations 600-1, 600-2, and 600-3, and may store information 1030 (e.g., in a database).

As further shown in FIG. 14, the traceroutes information may be correlated within a certain time frame (block 1430), and a device and/or link of the transport network may be determined as the source of the degradation based on the correlation (block 1440). For example, in embodiments described above in connection with FIG. 10, OSS 150 may correlate information associated with traceroutes 810 and 1010 within a certain time frame. The time frame may be configured to enable failures (or degradation) to be associated in time. OSS 150 may determine a device and/or a link of transport network 120 that is a source of degradation based on correlation of the information associated with traceroutes 810 and 1010. In one example, as shown in FIG. 10, network device 400-2 may be a source of degradation, and OSS 150 may determine that network device 400-2 is a source of degradation based on correlation of information associated with traceroutes 810 and 1010.

Returning to FIG. 14, a notification of the degradation source device and/or link may be provided to a user (block 1450), and the stored notifications, traceroutes information, and/or end point information may be deleted after a certain period of time (block 1460). For example, in embodiments described above in connection with FIG. 10, OSS 150 may provide a notification of the source of degradation (e.g., a device and/or a link of transport network 120), to a user (e.g., a system administrator in charge of maintaining network 100). Alternatively and/or additionally, OSS 150 may provide the user with a notification that the correlation of information associated with traceroutes 810 and 1010 is complete, and the user may manually analyze the correlation of information associated with traceroutes 810 and 1010. OSS 150 may remove information 1030 from the database after a defined time period. Alternatively and/or additionally, OSS 150 may provide the user with a notification of expiration of the defined time period, and the user may manually remove information 1030 from the database.

Embodiments described herein may provide systems and/or methods that determine a source of a fault (or degradation) in a transport network based on information associated with the transport network and detected by one or more base stations associated with access nodes.

Systems and/or methods described herein may determine transport network router/link failures or degradation based on correlation of traceroutes to a defined end point (e.g., a router) in the transport network. The systems and/or methods may also determine if a transport network failure or degradation resides within the public Internet or within a private intranet.

The foregoing description of embodiments provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 12-14, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary embodiments, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a device associated with a transport network, comprising:
   generating a first traceroute through the transport network;
   monitoring a performance measure associated with the transport network;
   comparing the performance measure to a criterion;
   determining degradation in the transport network when the performance measure matches the criterion;
   generating a second traceroute through the transport network when the degradation occurs in the transport network; and
   identifying a node in the transport network that is a source of the degradation in the transport network in response to the node being common to paths of the first and second traceroutes,
   wherein generating the first traceroute comprises:
   in response to the transport network comprising a secure intranet portion and an unsecure Internet portion, generating the first traceroute through one of 1) the unsecure Internet portion of the transport network and 2) a tunnel through the secure intranet portion of the transport network and repeating generation of the first traceroute through the other one of 1) the unsecure Internet portion of the transport network and 2) the tunnel through the secure intranet portion of the transport network.

2. The method of claim 1, further comprising:
   providing a notification of degradation in the transport network to an operations support system (OSS); and
   providing information associated with the first traceroute and the second traceroute to the OSS.

3. The method of claim 1, where the device comprises a base station associated with access nodes communicating with the transport network.

4. The method of claim 1, where the performance measure comprises one or more of:
   packet losses associated with the transport network;
   latency associated with the transport network; or
   jitter associated with the transport network.

5. The method of claim 1, where the source of the degradation in the transport network comprises one or more of:
   one or more network devices associated with the transport network; or
   one or more links associated with the transport network.

6. The method of claim 1, where the criterion comprises a threshold for comparing to the performance measure.

7. The method of claim 1, wherein each of a plurality of radio base stations carry out the generating the first traceroute through one of 1) the unsecure Internet portion of the transport network and 2) the tunnel through the secure intranet portion of the transport network and repeating generation of the first traceroute through the other one of 1) the unsecure Internet portion of the transport network and 2) the tunnel through the secure intranet portion of the transport network in response in response to the transport network comprising the secure intranet portion and the unsecure Internet portion.

8. The method of claim 1, wherein identifying a node in the transport network that is a source of the degradation in the transport network comprises correlating information from the first and second traceroutes within a defined time frame.

9. The method of claim 1, wherein identifying a node in the transport network that is a source of the degradation in the transport network comprises correlating information from the first and second traceroutes to a defined end point in the transport network.

10. A method, performed by a device associated with a transport network, comprising:
    generating a first traceroute through the transport network;
    monitoring a performance measure associated with the transport network;
    comparing the performance measure to a criterion;
    determining degradation in the transport network when the performance measure matches the criterion;
    generating a second traceroute through the transport network when the degradation occurs in the transport network; and
    identifying a node in the transport network that is a source of the degradation in the transport network in response to the node being common to paths of the first and second traceroutes,
    wherein generating the second traceroute comprises:
    in response to the transport network comprising a secure intranet portion and an unsecure Internet portion, generating the second traceroute through one of 1) the unsecure Internet portion of the transport network and 2) a tunnel through the secure intranet portion of the transport network and repeating generation of the second traceroute through the other one of 1) the unsecure Internet portion of the transport network and 2) the tunnel through the secure intranet portion of the transport network.

11. A device associated with a transport network, comprising:
    a memory to store a plurality of instructions; and
    a processor to execute instructions in the memory to:
    generate a first traceroute through the transport network,
    monitor a performance measure associated with the transport network,
    compare the performance measure to a criterion,
    determine that degradation in the transport network has occurred when the performance measure matches the criterion,
    generate a second traceroute through the transport network in response to the determined degradation in the transport network, and
    provide, to an operations support system (OSS), a notification of the determined degradation in the transport network and information associated with the first traceroute and the second traceroute, where the OSS uses the information associated with the first and second traceroutes to identify a node in the transport network that is a source of the determined degradation in the transport network in response to the node being common to paths of the first and second traceroutes, wherein, when generating the first traceroute, the processor is further configured to:

respond to the transport network comprising a secure intranet portion and an unsecure Internet portion by generating the first traceroute through one of 1) the unsecure Internet portion of the transport network and 2) a tunnel through the secure intranet portion of the transport network and repeating generation of the first traceroute through the other one of 1) the unsecure Internet portion of the transport network and 2) the tunnel through the secure intranet portion of the transport network.

12. A device associated with a transport network, comprising:

a memory to store a plurality of instructions; and a processor to execute instructions in the memory to:

generate a first traceroute through the transport network, monitor a performance measure associated with the transport network, compare the performance measure to a criterion, determine that degradation in the transport network has occurred when the performance measure matches the criterion, generate a second traceroute through the transport network in response to the determined degradation in the transport network, and provide, to an operations support system (OSS), a notification of the determined degradation in the transport network and information associated with the first traceroute and the second traceroute, where the OSS uses the information associated with the first and second traceroutes to identify a node in the transport network that is a source of the determined degradation in the transport network in response to the node being common to paths of the first and second traceroutes, wherein, when generating the second traceroute, the processor is further configured to:

respond to the transport network comprising a secure intranet portion and an unsecure Internet portion by generating the second traceroute through one of 1) the unsecure Internet portion of the transport network and 2) a tunnel through the secure intranet portion of the transport network and repeating generation of the second traceroute through the other one of 1) the unsecure Internet portion of the transport network and 2) the tunnel through the secure intranet portion of the transport network.

13. The device of claim 12, where the device comprises a base station associated with access nodes communicating with the transport network.

14. The device of claim 12, where the performance measure comprises one or more of:

packet losses associated with the transport network, latency associated with the transport network, or jitter associated with the transport network.

15. The device of claim 12, where the source of the determined degradation in the transport network comprises one or more of:

one or more network devices associated with the transport network, or one or more links associated with the transport network.

16. The device of claim 12, where the criterion comprises a threshold for comparing to the performance measure.

\* \* \* \* \*

UNITED STATES PATENT AND TRADEMARK OFFICE
CERTIFICATE OF CORRECTION

PATENT NO.        : 7,933,214 B2
APPLICATION NO.   : 12/201139
DATED             : April 26, 2011
INVENTOR(S)       : Stjernholm et al.

It is certified that error appears in the above-identified patent and that said Letters Patent is hereby corrected as shown below:

In Column 9, Line 16, delete "(Ipsec)" and insert -- (IPsec) --, therefor.

In Column 13, Line 44, delete "(Ipsec)" and insert -- (IPsec) --, therefor.

In Column 16, Lines 10-11, in Claim 7, delete "in response in response" and insert -- in response --, therefor.

Signed and Sealed this
Fourth Day of October, 2011

David J. Kappos
*Director of the United States Patent and Trademark Office*